United States Patent
Rope (10) Patent No.: US 8,842,993 B2
(45) Date of Patent: Sep. 23, 2014

(54) OPERATIONAL STATUS FLAG GENERATION IN AN OPTICAL TRANSCEIVER

(75) Inventor: Todd Rope, Glendale, CA (US)

(73) Assignee: Source Photonics, Inc., Chatsworth, CA (US)

(*) Notice: Subject to any disclaimer, the term of this patent is extended or adjusted under 35 U.S.C. 154(b) by 129 days.

(21) Appl. No.: 13/075,092

(22) Filed: Mar. 29, 2011

(65) Prior Publication Data

US 2012/0251100 A1    Oct. 4, 2012

(51) Int. Cl.
*H04B 10/00* (2013.01)

(52) U.S. Cl.
USPC ............................. 398/137; 398/22; 398/25

(58) Field of Classification Search
USPC .................................................. 398/135–139
See application file for complete search history.

(56) References Cited

U.S. PATENT DOCUMENTS

| | | | | |
|---|---|---|---|---|
| 5,956,168 | A * | 9/1999 | Levinson et al. | 398/41 |
| 6,952,531 | B2 | 10/2005 | Aronson et al. | |
| 7,079,775 | B2 * | 7/2006 | Aronson et al. | 398/137 |
| 7,200,336 | B2 * | 4/2007 | Yu et al. | 398/135 |
| 7,200,337 | B2 * | 4/2007 | Hosking et al. | 398/136 |
| 7,302,186 | B2 * | 11/2007 | Light et al. | 398/137 |
| 7,359,643 | B2 * | 4/2008 | Aronson et al. | 398/136 |
| 7,650,077 | B2 * | 1/2010 | Yu et al. | 398/137 |
| 7,894,723 | B2 * | 2/2011 | Moriwaki et al. | 398/135 |
| 7,912,375 | B2 * | 3/2011 | Kondo et al. | 398/135 |
| 2004/0136708 | A1 * | 7/2004 | Woolf et al. | 398/22 |
| 2004/0136719 | A1 * | 7/2004 | Hidai et al. | 398/135 |
| 2004/0136720 | A1 * | 7/2004 | Mahowald et al. | 398/135 |
| 2005/0031352 | A1 * | 2/2005 | Light et al. | 398/135 |
| 2005/0169636 | A1 * | 8/2005 | Aronson et al. | 398/136 |
| 2006/0263092 | A1 * | 11/2006 | Hosking et al. | 398/135 |
| 2006/0269283 | A1 * | 11/2006 | Iwadate | 398/22 |
| 2009/0226166 | A1 * | 9/2009 | Aronson et al. | 398/25 |
| 2010/0150567 | A1 * | 6/2010 | Kondo et al. | 398/137 |
| 2012/0008962 | A1 * | 1/2012 | Tanaka | 398/135 |
| 2012/0251100 | A1 * | 10/2012 | Rope | 398/25 |

OTHER PUBLICATIONS

Todd Rope; "Dynamic Memory Allocation in an Optical Transceiver"; U.S. Appl. No. 13/070,358, filed Mar. 23, 2011.

* cited by examiner

*Primary Examiner* — Agustin Bello
(74) *Attorney, Agent, or Firm* — Andrew D. Fortney; Murabito Hao & Barnes LLP (57) ABSTRACT

Methods, algorithms, architectures, circuits, and/or systems for determining the status of parameters associated with optical transceiver operation are disclosed. The optical transceiver can include an optical receiver to receive optical data; an optical transmitter to transmit optical data; one or more memories to store data (and, optionally, thresholds) for each of a plurality of parameters that are related to operation of at least one of the optical receiver and the optical transmitter; a microprocessor that compares the parametric data against the threshold(s) to calculate one or more flags to indicate whether a corresponding parameter has exceeded the first or second threshold; and an interface that receives a flag request from a host, and provides the one or more flags in response to the request. In the present disclosure, the microprocessor may calculate the one or more flags only in response to the flag request from the host.

22 Claims, 6 Drawing Sheets

OPERATIONAL STATUS FLAG GENERATION IN AN OPTICAL TRANSCEIVER

FIELD OF THE INVENTION

The present invention generally relates to the field of optical transceivers. More specifically, embodiments of the present invention pertain to status flag generation for data related to operation(s) of an optical transceiver.

DISCUSSION OF THE BACKGROUND

Optical transceivers send and receive data in an optical form over an optical link, such as a fiber-optic link. An optical transmitter can include laser driver circuitry to drive a laser or diode, such as a light-emitting diode (LED), to create optical pulses on the fiber-optic link from received electronic signals. An optical receiver can include a photosensitive diode to receive optical signals, which are then converted into electronic signals. Thus, an optical transceiver converts (i) optical signals into analog and/or digital electronic signals, and (ii) electronic signals into optical signals.

In order to determine if the optical transceiver is functioning correctly, various operational parameters are monitored. Flags are then generated to demonstrate the status of the operational parameters. In conventional approaches, the flags are calculated periodically based on a timer, and stored on the optical transceiver in a memory-mapped fashion. In this case, a host processor or circuit board passes a command or address to the transceiver in order to read a flag corresponding to a particular monitored parameter of the transceiver. However, a drawback of this approach is that an unknown amount of time may elapse between a calculation of a given flag and the request to read the flag by the host. As a result, the flag supplied by the optical transceiver to the host may not be up-to-date, thus not reflecting a current status of the associated parameter.

SUMMARY OF THE INVENTION

Embodiments of the present invention relate to methods, algorithms, architectures, circuits, software, and/or systems for generating operational status flags in optical transceivers.

In one embodiment, an optical transceiver can include (i) an optical receiver configured to receive optical data; (ii) an optical transmitter configured to transmit optical data; (iii) one or more memories configured to store data for each of a plurality of parameters that are related to operation of at least one of the optical receiver and the optical transmitter; (iv) a microprocessor configured to compare the data for one or more of the parameters against first and second thresholds to calculate one or more flags to indicate whether a corresponding parameter has exceeded the first or the second threshold; and (v) an interface configured to (a) receive a request for the one or more flags from a host and (b) provide the one or more flags in response to the request, where the microprocessor is configured to calculate the one or more flags only in response to the request from the host. This invention further relates to an optical triplexer that includes such an optical transceiver.

In another embodiment, a method of generating operational status flags in an optical transceiver can include (i) accessing data for each of a plurality of parameters that are related to operation of the optical transceiver; (ii) storing the parametric data in one or more memories; (iii) receiving a request for one or more flags from a host, the flags to indicate whether the data for a corresponding one or more parameters has exceeded one or more predetermined thresholds; and (iv) calculating the one or more flags in response to the request from the host by comparing the data for the corresponding one or more parameters against the threshold(s).

In yet another embodiment, a system for generating operational status flags can include (i) an optical transceiver configured to transmit and receive optical data, where the optical transceiver includes a microprocessor and a memory, the microprocessor being configured to access parametric data, and the memory being configured to store the parametric data and first and second predetermined thresholds, where the parametric data is related to one or more operations of the optical transceiver; and (ii) a host configured to provide a request to the optical transceiver for one or more flags that indicate whether a corresponding parameter has exceeded the first threshold or the second threshold, the host being configured to receive the one or more flags from the optical transceiver in response to the request, where the optical transceiver is configured to calculate the one or more flags in response to the request from the host.

Embodiments of the present invention can advantageously provide an approach that calculates an operational flag in response to a host requesting the flag from an optical transceiver. Embodiments of the present invention allow for more accurate and updated flag calculations with optimized resolutions to provide improved operational status determinations for the optical transceiver. These and other advantages of the present invention will become readily apparent from the detailed description of preferred embodiments below.

DETAILED DESCRIPTION OF THE PREFERRED EMBODIMENTS

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the disclosure.

Some portions of the detailed descriptions which follow are presented in terms of processes, procedures, logic blocks, functional blocks, processing, and other symbolic representations of operations on code, data bits, or data streams within a computer, processor, controller and/or memory. These descriptions and representations are generally used by those skilled in the data processing arts to effectively convey the substance of their work to others skilled in the art. A process, procedure, logic block, function, process, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, streams, values, elements, symbols, characters, terms, numbers, or the like, and to their representations in computer programs or software as code (which may be object code, source code or binary code).

It should be borne in mind, however, that all of these and similar terms are associated with the appropriate physical quantities and/or signals, and are merely convenient labels applied to these quantities and/or signals. Unless specifically stated otherwise and/or as is apparent from the following discussions, it is appreciated that throughout the present application, discussions utilizing terms such as "processing," "operating," "calculating," "determining," or the like, refer to the action and processes of a computer or data processing system, or similar processing device (e.g., an electrical, optical, or quantum computing or processing device or circuit), that manipulates and transforms data represented as physical (e.g., electronic) quantities. The terms refer to actions and processes of the processing devices that manipulate or transform physical quantities within the component(s) of a circuit, system or architecture (e.g., registers, memories, other such information storage, transmission or display devices, etc.) into other data similarly represented as physical quantities within other components of the same or a different system or architecture.

Furthermore, in the context of this application, the terms "wire," "wireline," "signal," "cable" and "bus" refer to any known structure, construction, arrangement, technique, method and/or process for physically transferring a signal from one point in a circuit to another. Also, unless indicated otherwise from the context of its use herein, the terms "designated," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Similarly, for convenience and simplicity, the terms "time," "rate," "period(ically)" and "frequency" are, in general, interchangeable and may be used interchangeably herein, but are generally given their art-recognized meanings. Also, for convenience and simplicity, the terms "data," "data stream," "bits," "bit string" and "information" may be used interchangeably, as may the terms "coupled to," and "in communication with" (which may refer to direct or indirect connections, couplings, or communications), but these terms are generally given their art-recognized meanings herein.

Embodiments of the present invention advantageously provide an approach that calculates an operational flag in response to a host requesting the flag from an optical transceiver. Embodiments of the present invention allow for more accurate and updated flag calculations with optimized resolutions to provide improved operational status determinations for the optical transceiver. The invention, in its various aspects, will be explained in greater detail below with regard to exemplary embodiments.

According to various embodiments of the present invention, an architecture or circuit for operational flag generation, suitable for use in optical transceiver systems, is provided. In general, an optical transceiver in accordance with particular embodiments includes a microprocessor or microcontroller that calculates an operational flag in response to a request for the flag from a host. This approach can allow a fiber optic transceiver to provide a more updated status of a parameter related to operation(s) of the transceiver, relative to conventional approaches.

Exemplary Operational Status Flag Generation System

In one example, a system for generating operational status flags can include (i) an optical transceiver configured to transmit and receive optical data, where the optical transceiver includes a microprocessor and a memory, the microprocessor being configured to access parametric data, and the memory being configured to store the parametric data and first and second predetermined thresholds, where the parametric data is related to one or more operations of the optical transceiver; and (ii) a host configured to provide a request to the optical transceiver for one or more flags that indicate whether a corresponding parameter has exceeded the first or the second threshold, the host being configured to receive the one or more flags from the optical transceiver in response to the request, where the optical transceiver is configured to calculate the one or more flags only in response to the request from the host. For example, the first predetermined threshold may be a low threshold, and the second predetermined threshold may be a high threshold, such that a range (e.g., a normal operating range for the corresponding parameter) is defined by the low and high thresholds.

Figure 1:
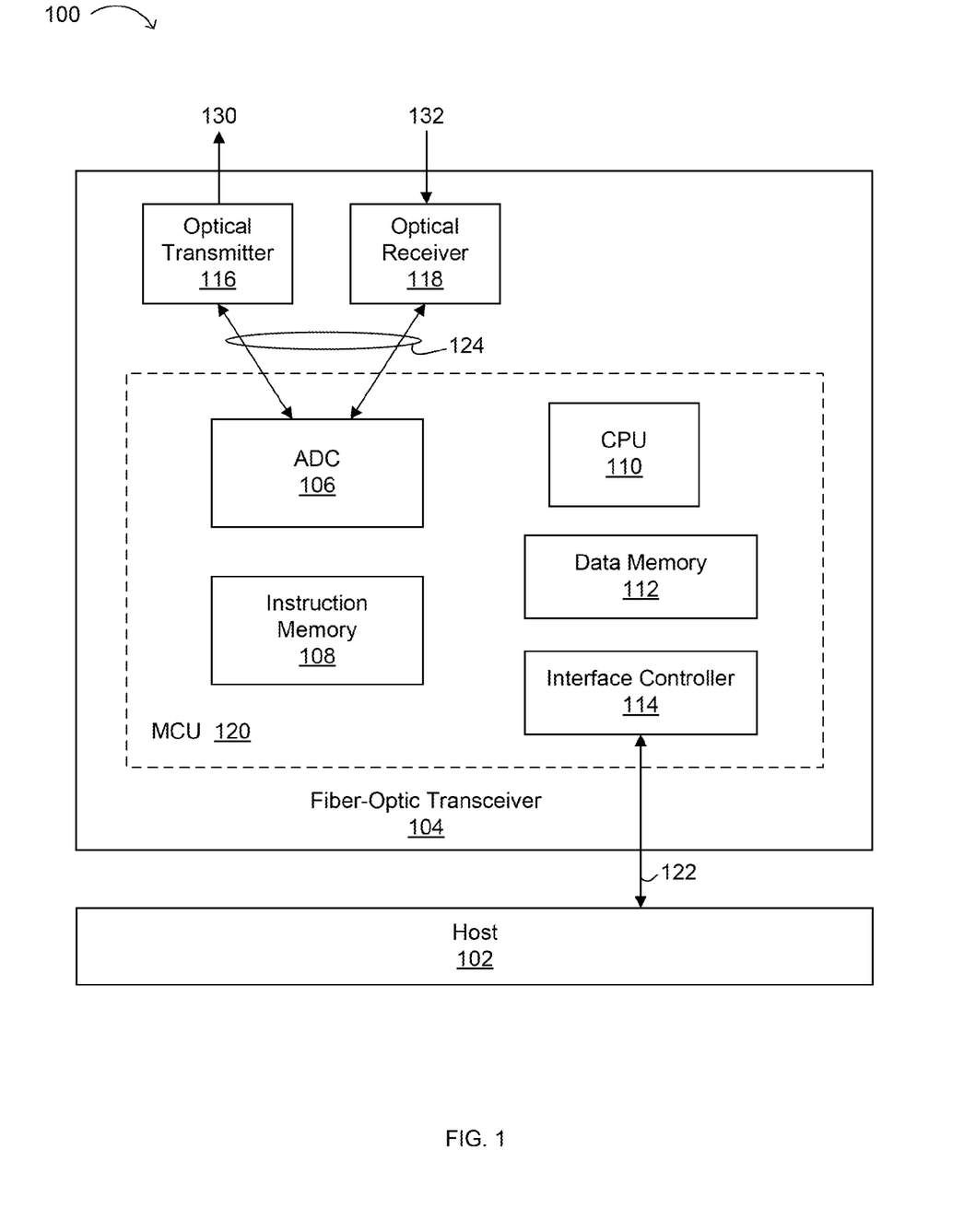
FIG. 1 is a block diagram showing an exemplary optical transceiver system in accordance with embodiments of the present invention.

FIG. 1 illustrates an exemplary optical transceiver system 100 in accordance with embodiments of the present invention. Optical transceiver system 100 can include optical transceiver 104 (e.g., a fiber-optic transceiver) and host 102. Host 102 can be a host processor, circuit board, stand-alone optical network device (e.g., repeater, optical switch, set-top box, etc.) or any other component or device including a suitable controller or processor. Host 102 can interface with optical transceiver 104 via communications interface 122. For example, communications interface 122 can be a serial interface. Alternatively, communications interface 122 can be a parallel interface including a plurality of bit signals.

Optical transceiver 104 can include microcontroller (MCU) 120, optical transmitter 116, and optical receiver 118. For example, optical transmitter 116 can include a light-emitting diode (LED), laser diode, or any other suitable device for generating light pulses (e.g., optical signals) over an optical signal medium 130 (e.g., a fiber-optic link). Optical receiver 118 can be a photo-diode or any other device configured to receive an optical signal 132 and convert the received optical signal into an electrical signal. Optical signals 130 and 132 may be separate optical links, or may be part of a common fiber-optic link or any other suitable optical connection (e.g., optical waveguide, multi-mode fiber[s] [MMF], single-mode fiber[s] [SMF], etc.). In addition, an optical duplexer, an optical triplexer, or other multiple transceiver configurations can be formed by including two or more optical transceivers 104 or components thereof (e.g., two or more optoelectronic receivers with a single optoelectronic transmitter).

Analog electronic signals 124 are transmitted between analog-to-digital converter (ADC) 106 and optical transmitter 116, and between optical receiver 118 and ADC 106. Analog electronic signals 124 can accommodate optical signal information in an electronic form. ADC 106 can then convert these electronic signals from an analog form into a digital form to allow for digital processing within MCU 120. MCU 120 can further include interface controller 114, central processing unit (CPU) or microprocessor 110, instruction memory 108, and data memory 112. MCU 120 generally receives and transmits communications with host 102 over host communications interface 122.

In certain embodiments, instruction memory 108 is a non-volatile memory, and data memory 112 is a volatile memory (e.g., RAM). However, instruction memory 108 can alternatively be a volatile memory, or may contain portions of both non-volatile and volatile memories. Also, data memory 112 can alternatively be a non-volatile memory, or may contain portions of both volatile and non-volatile memories. Examples of non-volatile memories include electrically erasable programmable read-only memory (EEPROM), Flash EEPROM, magnetoresistive RAM (MRAM), laser programmable memories (e.g., fuse-based), or any other suitable type of ROM or non-volatile storage. Examples of volatile memories include static random-access memory (SRAM), dynamic RAM (DRAM), or any other suitable type of RAM or volatile storage element that maintains a stored state when power is applied.

In addition, while data memory 112 is generally described herein as storing parametric data related to transceiver operation(s), as well as associated thresholds (e.g., for use in determining whether a particular parameter in the parametric data exceeds or falls within a corresponding threshold level from an associated threshold register), such data and/or information can alternatively or additionally be stored in instruction memory 108. For example, considerations of performance, memory availability and operational efficiency can be used to determine whether parametric data and/or threshold data are stored in instruction memory 108 and/or data memory 112. In some applications, instructions can be stored in RAM or other data memory for performance reasons. Further, various data memory (e.g., threshold data) can be stored in ROM or other non-volatile memory for efficiency reasons, such as when the stored data does not change or changes relatively infrequently.

Exemplary Optical Transceiver

In one example, an optical transceiver can include (i) an optical receiver configured to receive optical data; (ii) an optical transmitter configured to transmit optical data; (iii) one or more memories configured to store data for each of a plurality of parameters that are related to operation of at least one of the optical receiver and the optical transmitter; (iv) a microprocessor configured to compare the data for one or more of the parameters against first and second thresholds to calculate one or more flags to indicate whether a corresponding parameter has exceeded the first or the second threshold; and (v) an interface configured to (a) receive a request for the one or more flags from a host and (b) provide the one or more flags in response to the request, where the microprocessor is configured to calculate the one or more flags only in response to the request from the host. This invention further relates to an optical triplexer that includes such an optical transceiver.

Figure 2:
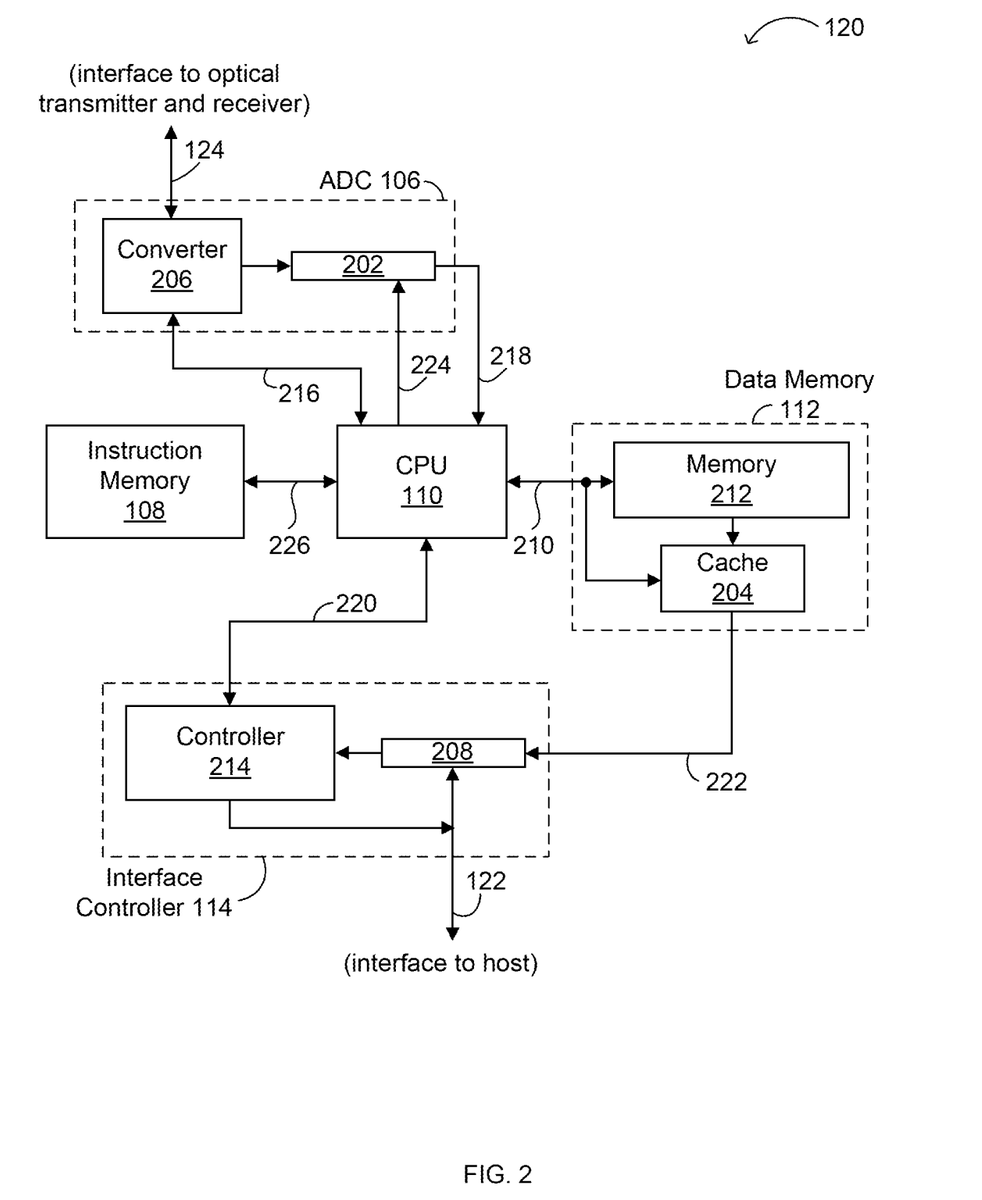
FIG. 2 is a block diagram showing an exemplary microcontroller for an optical transceiver in accordance with embodiments of the present invention.

FIG. 2 illustrates an exemplary microcontroller 120 for an optical transceiver in accordance with embodiments of the present invention. ADC 106 can interface with an optical transmitter and an optical receiver (not shown) via optical information signals 124. CPU 110 may utilize control signal 216 for interacting with ADC 106 via converter 206. Register 202 can contain an output for ADC 106 by capturing output data from converter 206. In some cases, a demultiplexer (not shown) or a bank of registers may be used in addition to, or in place of, register 202 in order to support a higher rate of data output from converter 206. For example, data can be output from converter 206 into a bank of registers in a sequential or round-robin fashion. In the example of a demultiplexer, data output from converter 206 may be sent via the various demultiplexer outputs to CPU 110.

For example, register 202 can include parametric data related to operation(s) of optical transmitter 116 and/or optical receiver 118 (see, e.g., FIG. 1). As discussed above, register 202, while shown in FIG. 2 as a single register, can also be implemented as a bank of registers, or an otherwise larger memory portion for capturing larger amounts of data from ADC 106. For example, various parametric data can be captured in a serial fashion or in parallel. As a result, although the output of converter 206 is generally multi-bit (e.g., n bits wide, where n is an integer of at least 2, such as 4, 6, 8, 10, 12, 16, 32, etc.), the data output by register 202 may be serial or parallel. In order for CPU 110 to retrieve this parametric data, data access control signal 224 can be activated by CPU 110. In response to control signal 224, data from register 202 can be output via ADC output signal/bus 218.

Parametric data can be supplied to ADC output register 202 and/or accessed by CPU 110 (via ADC output signal/bus 218) at a predetermined frequency and/or on-demand. For example, converter 206 can periodically update register 202 during normal operation of ADC 106 and/or CPU 110. If data access control signal 224 is held in an activated state, CPU 110 can receive the periodically updated data from register 202 via ADC output signal 218 at this same frequency. For example, this parametric update rate can vary from about 1 ms to about 100 ms (e.g., about 50 ms), or at any other update rate within this range or outside this range, depending on the operating frequencies of ADC 106 and CPU 110 and the design of register 202 (e.g., whether it is or is part of a bank of registers, whether it includes a demultiplexer, etc.). Certain embodiments may also support a plurality of parametric data update rates (e.g., different update rates for different parameters), including variable update rates for one or more of the parameters for which data are periodically updated.

In some applications, this parametric data update rate can be programmed by a user. For example, a variety of supported update rates can be presented to a user for selection via a graphical user interface (GUI). Also, while a given parametric data update rate can be selected or otherwise fixed, parametric data can also be updated upon demand, such as in response to a flag request from host 102. In some cases, an option (e.g., a user option) can be employed whereby the parametric data is designated to be determined periodically or only updated upon demand. In other cases, on-demand parametric data updating can essentially act as an override to an otherwise periodic parametric data update mode. Thus, parametric data can be updated via register 202 and ADC output signal 218 periodically and/or upon demand, and these parametric data update modes may depend on particular applications, certain parameters, as well as customer/user configurations.

CPU 110 can retrieve (e.g., fetch and/or pre-fetch) instructions from instruction memory 108 via interface signals 226. CPU 110 can also interface with data memory 112 via bus(es)

210. For example, parametric data received from ADC output 218 can be provided on bus(es) 210 to data memory 112 for storage. Bus(es) 210 may be a single bus or multiple-bit bus configured for serial and/or parallel communication, and may support unidirectional and/or bidirectional signaling. CPU 110 can also send control signals on bus(es) 210 to control accessing of parametric data and thresholds (e.g., threshold values) from data memory 112 in order to calculate operational status flags therefrom. Such accessing of parametric data and thresholds from data memory 112 may be performed in periodic fashion and/or in response to on-demand requests, such as requests from host 102 to retrieve an operational flag. For example, data memory 112 can be accessed by CPU 110 and provide parametric data and thresholds at substantially a same rate that ADC output signal 218 is updated, or at a higher or lower rate.

In one example, data memory 112 can include memory portion 212 and cache portion 204. Cache portion 204 can be a smaller and faster memory (e.g., have a smaller capacity/density and be configured to operate at a higher frequency) relative to the remaining portion of data memory 112. Memory portion 212 and/or cache portion 204 can also include a variety of registers that can be allocated for storage of parametric data and/or storage of threshold values. Further, memory portion 212 and cache portion 204 can be subdivided into any number of blocks or other arrangements (e.g., different integrated circuits [ICs]) of memory. In this particular exemplary arrangement, cache portion 204 can provide data memory output signal 222 to interface controller 114. For example, cache portion 204 may store copies of certain parametric data and associated thresholds that are most likely to be requested by CPU 110 for status flag calculation. In one embodiment, a user may configure a predetermined number of parameters and/or thresholds to be stored in cache portion 204 and memory portion 212 such that an associated operational status flag can be calculated and provided to host 102 in less processing time. Alternatively, copies of parametric data and associated thresholds in memory portion 212 can be made in cache portion 204 based on other factors, such as parametric data and/or thresholds that are most recently written to or stored in memory portion 212, or parametric data and thresholds that correspond to an operational status flag most recently requested by host 102. In this fashion, cache portion 204 may effectively be used to decrease operational status flag calculation time to service a request from host 102.

In certain embodiments, MCU 120 maintains parametric data, thresholds, and (optionally) associated operational status flag storage information in data memory 112. A request for a status flag can be received by interface controller 114 via host communications interface 122. The flag request from host 102 can include an identifier of the requested flag(s). Register 208 can store the incoming flag identifier as well as associated outgoing flag value information. Alternatively, separate registers can be used to store incoming identifier information and outgoing flag data. Controller 214 (e.g., microcontroller, programmable logic device (PLD), complex PLD (CPLD), field-programmable gate array (FPGA), etc.) within interface controller 114 can send the request to CPU 110 using command signal(s) 220. CPU 110 may then correlate or map the identifier from the flag request to particular memory locations in data memory 112 at which the corresponding parametric data and associated thresholds are located. For example, CPU 110 may maintain a table that maps the identifier from the flag request to the appropriate storage locations in data memory 112 so that CPU 110 can retrieve corresponding parametric data and thresholds for calculation of the requested flag.

Once CPU 110 receives the flag request via command signal/bus(es) 220, CPU 110 can send a memory read request to data memory 112 via signal 210. Once the request command, or a version or derivative thereof (e.g., a flag identifier), received on host communications interface 122 is sent to CPU 110 via command signal 220, CPU 110 can issue a read command via bus(es) 210 to data memory 112. As part of this process, CPU 110 can effectively translate information received from host 102 as part of the flag request into actual memory locations that store the parametric data and associated thresholds to be accessed in order to calculate the requested flag. The calculated flag can then be sent from the CPU 110 to the data memory 112, and read from data memory 112 via memory output signal 222. Alternatively, the calculated flag may be directly sent from CPU 110 to interface controller 114. In any event, interface control register 208 can receive the requested flag, which may then be provided to host 102 via host communications interface 122. As discussed above, interface control register 208 may also be used to store the incoming identifier parsed or derived from the flag request from host 102. In this case, register 208 may be wide enough (e.g., 32 bits wide, 64 bits wide, 128 bits wide, etc.) to accommodate such incoming request information and outgoing flag information. Alternatively, separate registers (e.g., having a width of 16 bits, 32 bits, 64 bits, etc.) can be used to store incoming flag identifier information and outgoing flag value data. Further, various registers and storage locations discussed herein may also be lumped together in the same memory block or other similar storage structure.

Figure 3:
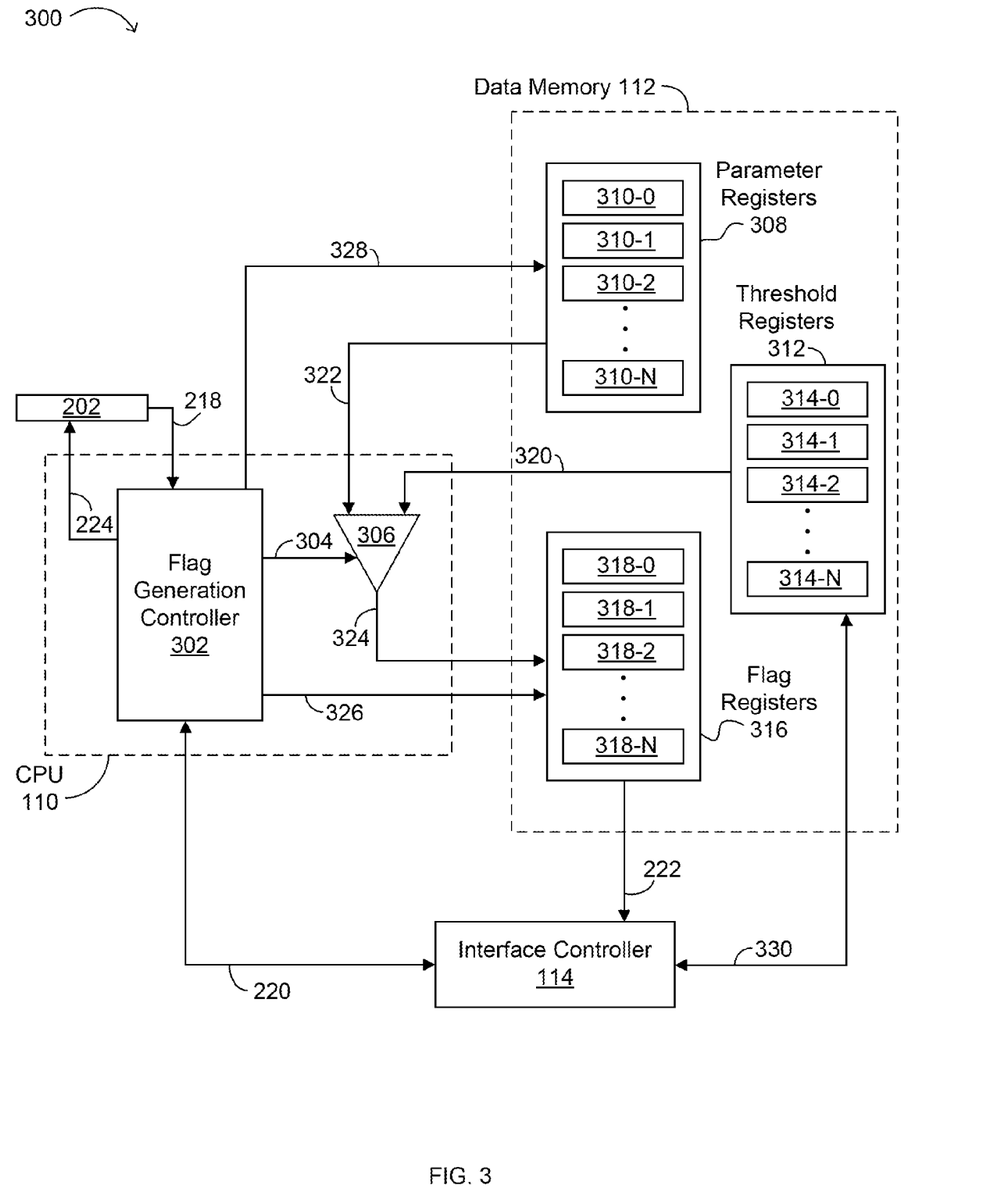
FIG. 3 is a block diagram showing an exemplary flag generation control structure in accordance with embodiments of the present invention.

FIG. 3 illustrates an exemplary flag generation control structure 300 in accordance with embodiments of the present disclosure. Flag generation controller 302 in CPU 110 can activate signal 224 to read the parametric data contents of ADC output register 202 on ADC output signal/bus 218. Flag generation controller 302 can then write the accessed parametric data into parameter registers 308 via bus 328. Buses and/or signals 320, 322, 324, 326, and 328 shown in FIG. 3 may represent more detailed versions of the bus(es) 210 shown in FIG. 2. For example, parameter registers 308 can include any number of registers 310 (e.g., 310-0, 310-1, 310-2, ... 310-N). As discussed above, ADC output register 202 may be implemented as a bank of registers instead of one register, and parameter registers 308 may form this bank of registers as a replacement for, or in addition to, ADC output register 202.

Threshold registers 312 can include various individual registers 314 (e.g., 314-0, 314-1, 314-2, ... 314-N) for storing threshold data for use in determining whether a particular parameter 310 exceeds or falls within a corresponding threshold value from a threshold register 314. In one embodiment, threshold registers 312 may store a plurality of thresholds corresponding to a given parameter, for use in calculating a corresponding number of operational flags. Such thresholds can include both a low threshold and a high threshold to indicate when a given parameter falls within a predetermined range. Thus, when parametric data is greater than or equal to the high threshold, a corresponding operational flag may indicate this status with a first state, and when the parametric data is less than the high threshold, a corresponding operational flag may indicate this status with a second state. Similarly, when parametric data is less than or equal to the low threshold, a corresponding operational flag may indicate this status with the first state or a third state, and when the parametric data is greater than the low threshold, the flag may indicate this status with the second state or a fourth state. Alternatively, Boolean logic may be used to combine such first through fourth states to give two states (e.g., in range or out of range) or three states (e.g., in range, high, or low). In this fashion, an operational flag can be calculated to indicate whether parametric data falls within a given range defined by the high and low thresholds.

A higher number of thresholds (e.g., 4, 6, 8, etc.) can also be used to designate multiple threshold ranges. For example, threshold registers 314 may store a plurality of thresholds configured to indicate a low warning, a low alarm, a high warning, and a high alarm, to form a narrower range (e.g., corresponding to the low and high warnings) within a wider range (e.g., corresponding to the low and high alarms). In one example, a "warning" flag may indicate an operable system, but in which the system does not ensure or guarantee continued operability. On the other hand, an "alarm" flag may represent a possible imminent shutdown of the system. Thus, the alarm flag(s) may indicate that the system is at risk of shutdown due at least in part to the associated operational parametric data meeting or exceeding the designated alarm threshold. Further, for a given target value of a parameter, the alarm thresholds may represent about +/−10% of that target value, while the warning thresholds may represent about +/−5% of that target value. In certain embodiments, acceptable threshold values and ranges (e.g., +/−15%, +/−20%, etc.) about target parameter values can be programmed and stored in threshold registers 314.

Acceptable threshold register sizes (e.g., 8 bits wide, 16 bits wide, 32 bits wide, etc.), depending on CPU architecture, operating system, as well as other design considerations, etc., can be determined for each particular embodiment utilized. In certain embodiments, acceptable threshold register formats (e.g., bit maps, unsigned/signed integers, IEEE floating point, etc.) can also be supported. Further, any suitable capacity (e.g., at least 2 kB, several kB, 16 kB, or higher) of data memory 112 can be supported in particular embodiments. Also, any suitable memory technologies or types of memories (e.g., flash memory, serial EEPROM, SRAM, DRAM, etc.) can be supported in particular embodiments. In addition, cache memory 204 (see, e.g., FIG. 2) can represent a smaller and faster memory relative to a remaining portion of data memory 112. Various registers and/or allocated memory portions can be found or replicated within cache memory 204 to support faster accesses to parametric data, thresholds, and/or flags that may be stored therein.

Examples of parameters for which data are obtained, sampled, processed, and/or analyzed can include temperature, voltage (e.g., supply voltage), optical or laser bias current, transmitted laser optical power, and received optical power. Each such parameter can be associated with one or more flags to indicate the operational status of the parameter or component for which parametric data are obtained. Also, parametric data can be stored at any suitable allocated memory location, as may be determined in dynamic fashion (see, e.g., U.S. patent application Ser. No. 13/070,358, filed Mar. 23, 2011. The temperature data may represent, e.g., different instances or samplings of the same temperature parameter. As another example, temperature data stored at one memory location may represent an average, summation, or other mathematical calculation (e.g., minimum/maximum determinations) of temperature data stored in other memory location(s).

Any parametric data related to optical transceiver operation(s) can be utilized for operational status flag generation in particular embodiments. For example, referring to FIG. 1, temperatures of multiple structures or units in optical transceiver 104, such as the temperature of the transmitting laser, a module, the optical transmitter 116 as a whole, a circuit providing a bias current to the laser or a modulator applied to the laser, and/or a temperature of optical receiver 118 can be compared against corresponding thresholds to determine status flags. In one implementation, a warning threshold for the temperature of the transmitting laser or the bias circuit can be set at a value of from about 70° C. to about 80° C. (e.g., about 75° C.), and an alarm threshold for the same parameter(s) can be set at a value of from about 80° C. to about 90° C. (e.g., about 85° C.). Also, for example, voltages of multiple structures, signals, or units in optical transceiver 104 can be used in status flag determination. In addition, power-related parameters can include transmitter power, radio-frequency (RF) power and/or video power, such as transmitted optical digital power, received optical digital power, received optical video power, RF output power, and/or video output power. Further, any other laser related data, such as laser wavelength(s) and/or channel spacing(s), can also be accommodated in status flag generation.

Functions or parameters related to operation of the optical transceiver can also be changed over time. For example, data output from ADC 106 (e.g., at ADC output register 202; see FIG. 3) can be adjusted (e.g., by formula, calibration, re-programming, etc.) such that different data is accessed. Parameter registers 308, threshold registers 312, ADC output register 202, and/or other associated registers can also be re-programmed to change the information that is stored therein. For example, threshold registers 312 can be programmed by a user via host 102 by way of interface controller 114. Threshold registers 312 may also contain default values that may be overridden by the user to define other thresholds for a given parameter. For example, bus(es) 330 can be used to provide updated threshold values from interface controller 114 to threshold registers 312 to reprogram the threshold registers 312.

When flag generation controller 302 receives a flag request from interface controller 114 via command signal 220, comparator 306 can be activated via comparator enable signal 304. For example, comparator 306 may be a digital comparator or magnitude comparator that receives two numbers as input in binary form (e.g., bit strings) and determines whether a first one of the numbers is greater than, less than, or equal to the second number. Based on an identifier in the flag request, flag generation controller 302 can access corresponding parametric data from parameter registers 308 on bus 322, and corresponding thresholds from threshold registers 312 on bus 320. Comparator 306 may then compare appropriate parametric data (e.g., via bus 322) against corresponding thresholds (e.g., via bus 320) to determine a flag value at comparator output 324 that indicates the relative magnitude of the parametric data versus the threshold. Control signal(s) 326 can be used to enable an appropriate flag 318 (e.g., 318-0, 318-1, 318-2, . . . 318-N) from flag registers 316 to be supplied via data memory output signal/bus 222 to interface controller 114 for servicing the request from host 102. Alternatively, the comparator 306 can provide the flag value (e.g., at comparator output 324) directly to interface controller 114 in response to the request from host 102.

Exemplary Methods of Generating Operational Status Flags

In one example, a method of generating operational status flags in an optical transceiver can include (i) accessing data for each of a plurality of parameters that are related to operation of the optical transceiver; (ii) storing the parametric data in one or more memories; (iii) receiving a request for one or more flags from a host, the flags to indicate whether the data for a corresponding one or more parameters has exceeded a first or a second predetermined threshold; and (iv) calculating the one or more flags in response to the request from the host by comparing the data for the corresponding one or more parameters against the first and second thresholds.

Figure 4:
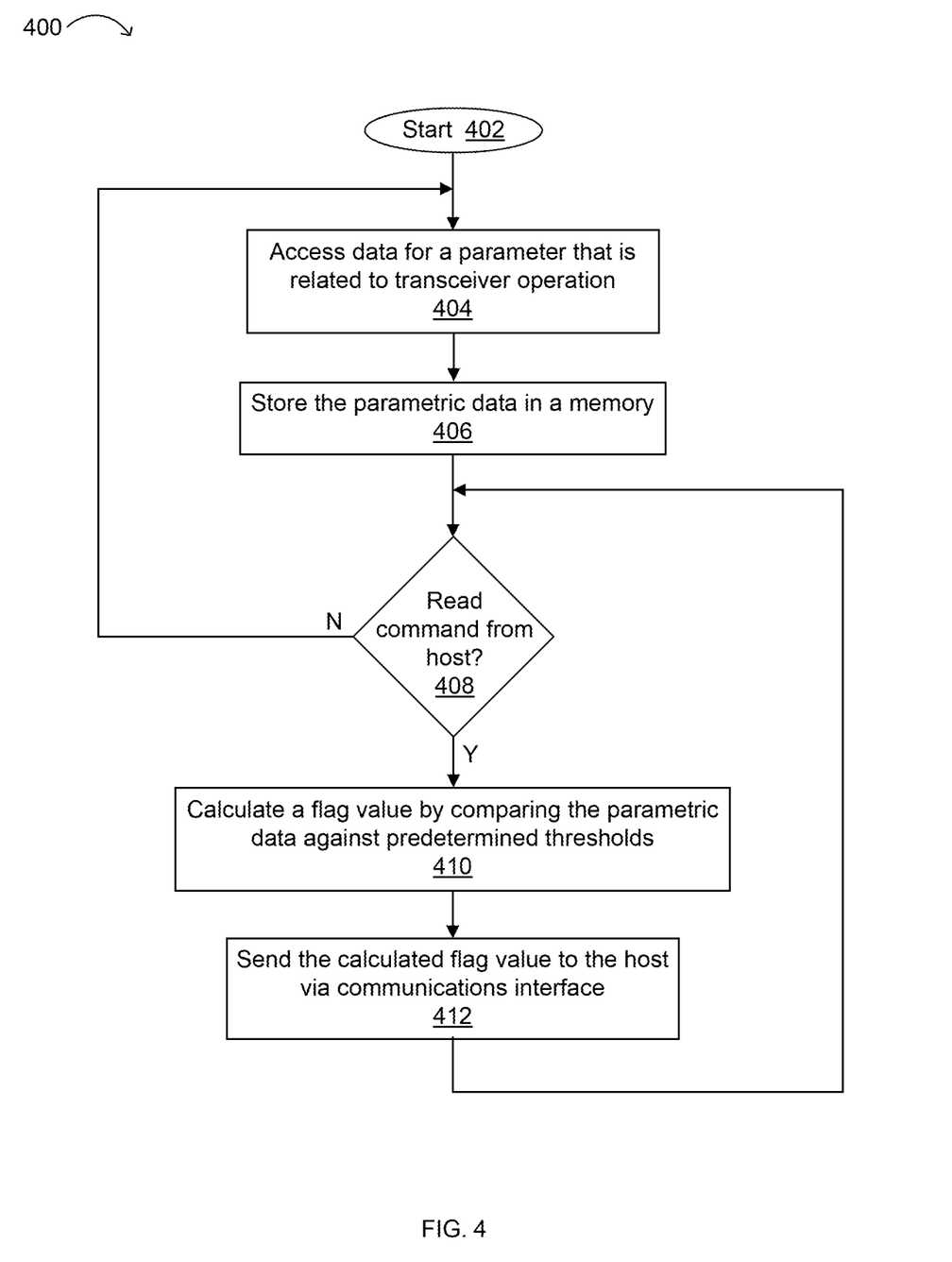
FIG. 4 is a flow diagram showing an exemplary method of generating operational status flags in accordance with embodiments of the present invention.

FIG. 4 illustrates an exemplary method 400 of generating operational status flags in accordance with embodiments of the present disclosure. The flow can begin at 402, and at 404, parametric data related to transceiver operation(s) can be accessed. For example, referring to FIGS. 2-3, CPU 110 can access parametric data from ADC output register 202. The accessed parametric data can then be stored in a memory at 406. For example, parametric data can be stored at a location 310 in parameter registers 308 within data memory 112. Thus, parametric data can be transferred from ADC output register 202 to a suitable location (e.g., a dynamically allocated location) in data memory 112 (e.g., in parameter registers 308). Further, pointers can also be utilized to subsequently find corresponding locations of stored parametric data in data memory 112 (e.g., parameter registers 308). Alternatively, parametric data may be directly accessed by CPU 110 from ADC output register 202. In this case, the accessed parametric data may also be stored in data memory 112 (e.g., as a simultaneous or subsequent write operation to data memory 112).

If at 408 no flag request (e.g., a read command) from a host is received, the flow returns to 404 to access parametric data. Thus, continued parameter monitoring, accesses within the optical transceiver, and storage of the parametric data at allocated memory locations may occur until a flag request is received from the host at 408. In addition, threshold values may be updated in threshold registers 312 via bus(es) 330 (see FIG. 3). Once a request to read flag data is received from the host at 408 (FIG. 4), a flag value may be calculated at 410 by comparing parametric data corresponding to the requested flag against associated predetermined thresholds. For example, referring back to FIG. 3, flag generation controller 302 can utilize or activate comparator 306 using comparator enable signal 304 to digitally compare magnitudes of corresponding parametric data on bus 322 against associated threshold values on bus 320 to provide a flag value on comparator output signal/bus 324. For example, the flag value on comparator output signal/bus 324 may be a bit string representation of the relative magnitudes of parametric data on bus 322 versus one or more threshold values on bus 320. Alternatively, the flag value on signal/bus 324 may be a single bit value that indicates whether a particular threshold (e.g., one bit per threshold comparison) has been exceeded, or whether either of a pair of thresholds defining a range has been exceeded (e.g., less than a low threshold or greater than a high threshold).

Referring to FIG. 4, the flag value may then be retrieved from data memory 112 and sent to the host via a communications interface at 412, and the flow may return to 408 to determine if there is another read command from the host. Alternatively or additionally, the flag may be directly provided to the host via the communications interface (e.g., communications interface 122 of FIG. 1). For example, parametric data stored in register 310-2 can be compared against one or more associated threshold(s) stored in threshold register 314-2, whereby the calculated flag is passed via bus 324 for storage in flag register 318-2 in flag registers 316. However, any suitable register storage (e.g., using pointers, concatenated registers, etc.) can be used in certain embodiments. The flag data from flag register 318-2 can then be supplied to interface controller 114 via memory output signal 222, and then sent from interface controller 114 to host 102 via host communications interface 122. When a subsequent flag read request is received from the host at 408 (FIG. 4), the subsequent flag read request can similarly be translated to access new parametric data and thresholds from data memory 112 for calculation of a new or subsequent flag value. In one embodiment, after a subsequent flag value has been determined, if there is no pending request for a flag from the host at 408, the flow may return to 404 to access parametric data. In further embodiments, both of a first loop 404, 406 and 408 can run continuously and/or simultaneously with a second loop 408, 410 and 412.

As discussed above, the rates at which parametric data is accessed and stored at allocated memory locations, as compared to the rates at which flag read commands are received from the host and a calculated flag is sent in response to the host request, are variable and not necessarily equal in particular embodiments. For example, as described with respect to FIG. 4, the flow including 404, 406 and 408 can occur at one rate, while the flow including 408, 410 and 412 can occur at a different rate. Stated differently, parametric data can be accessed and stored in allocated memory at a rate that is independent of the rate at which a host requests flag data and such a flag is calculated. Alternatively, the two rates may be the same, such as when parametric data is obtained or accessed on demand in response to a flag read request.

Figure 5:
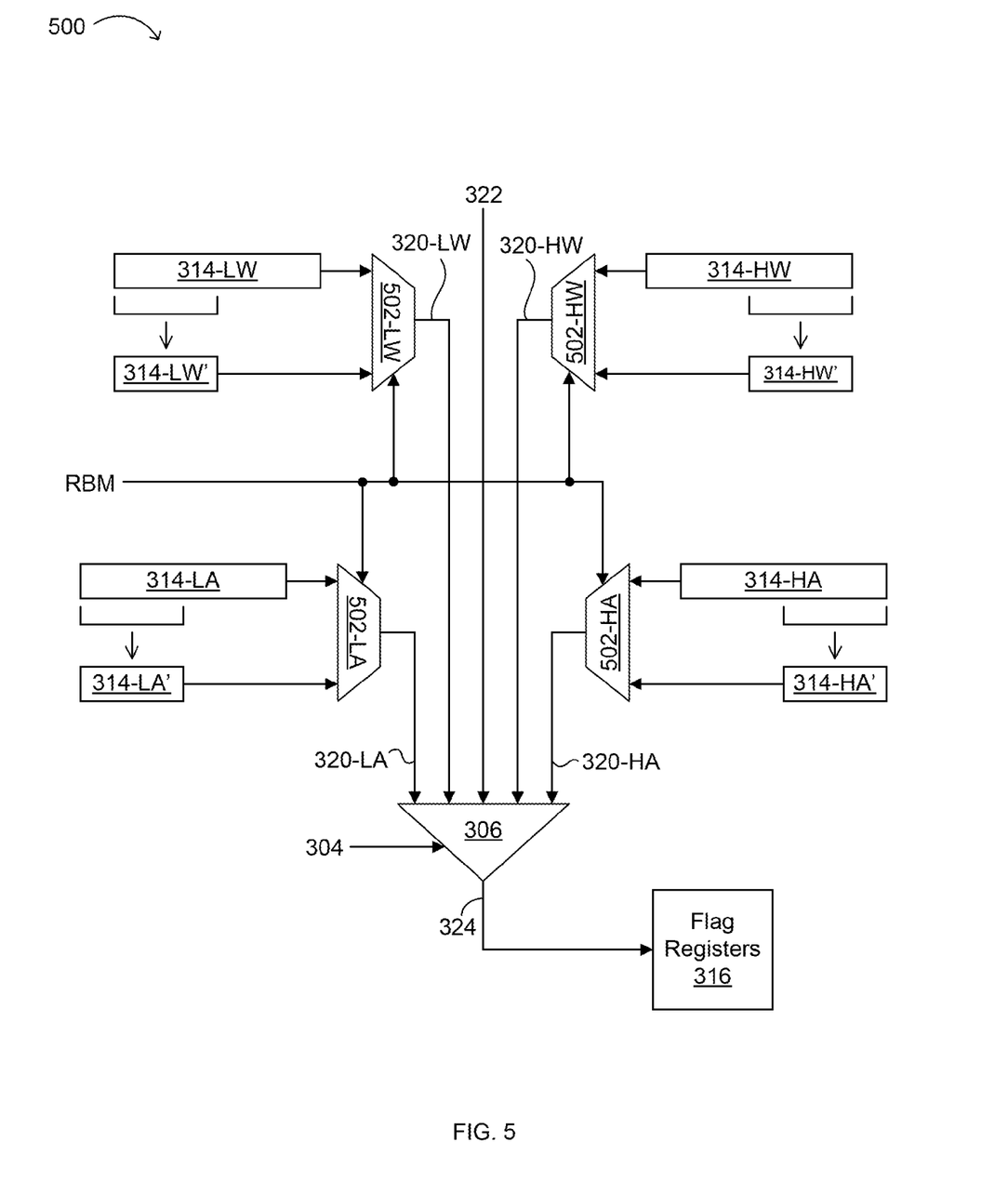
FIG. 5 is a block diagram showing an exemplary threshold selection and comparison structure for flag generation in accordance with embodiments of the present invention.

FIG. 5 illustrates an exemplary threshold selection and comparison structure 500 for flag generation in accordance with embodiments of the present invention. In certain embodiments, flag generation time can be reduced by utilizing a subset of the bits or a bit-reduced value in a threshold register to compare with a corresponding bit-reduced value of parametric data. For example, the subset of bits (e.g., 6, 8, or 10 bits) may be derived from a wider (e.g., 16-bit) register. In determining when bit-reduced values are to be used to reduce flag generation time, considerations of sensitivity (e.g., higher resolution) versus safety (e.g., lower resolutions desirable when safety is not an issue) as to the underlying functional elements in the optical transceiver may be undertaken. Thus, flags representing more critical optical transceiver operations may be generated using full comparison or non-bit-reduced techniques, whereas flags representing less critical operations may be generated using bit reduction techniques (e.g., utilizing one or more bit subsets) when enabled (e.g., via user programming). In one example, the 8 bits used as a bit-reduced value may be varied (e.g., by one bit at a time), such as in a round-robin pattern. In another example, the N most significant bits of the full-bit value may be chosen as the bit-reduced value, where N is at least two but less than the full width (e.g., M bits) of the parameter register (e.g., N is from 4 to 10, and M is 16 or 32). In using bit reduction techniques, flag calculation granularity may be reduced, but the speed of the calculation may be increased due to fewer bits being involved in accessing and comparing the data.

In certain embodiments, a bit-reduced threshold value can be used as a different mathematical representation or manifestation of a stored threshold. For example, threshold comparisons for a given parameter may not need an entire threshold value (e.g., 16 bits), but rather can employ a predetermined subset of that threshold value (e.g., the 8 most significant bits of the 16-bit threshold value), or another mathematical representation of the threshold value. For example, a magnitude of a real-time value (e.g., data from ADC output register 202) may be used to determine a divisor. In one exemplary mathematical representation, the divisor can be generated from the real-time value (e.g., M bits) by determining a smallest number that can be divided by while still retaining an N-bit number, where N is an integer less than M, and M is an integer representing the full comparison width (e.g., 16 bits, 32 bits). The divisor and thresholds (e.g., threshold register 314 from threshold registers 312) can be divided by the divisor to produce corresponding bit-reduced N-bit values. Then, these N-bit values can be compared (e.g., parametric data versus thresholds) to determine corresponding N-bit flag values. In this fashion, the flags can be calculated faster than by comparing full-bit (M-bit) value information.

In the example of FIG. 5, thresholds 314 (e.g., threshold 314-LW, 314-LW', 314-LA, 314-LA', etc.) from threshold registers 312 correspond to different threshold ranges formed by low warning (LW), low alarm (LA), high warning (HW), and high alarm (HA) thresholds. Thus, threshold 314-LW may represent a low warning threshold corresponding to parametric data on bus 322. Thresholds 314-LW, 314-HW, 314-LA, and 314-HA may be stored in threshold registers 312 by using concatenated registers, a block of registers, a suitably wide register (e.g., 64 bits), etc. Parametric data on bus 322 may be retrieved from parameter registers 308, or may be accessed directly from ADC output register 202. Further, because bit-reduced values may be used, parametric data on bus 322 may also be bit-reduced (e.g., N bits instead of M bits, where N is a positive integer [e.g., 8] less than positive integer M [e.g., 16]) prior to being stored in parameter registers 308. Alternatively, both a complete or full-bit parametric data version (e.g., 16 bits) and a reduced-bit parametric data version (e.g., 8 bits) may be stored in parameter registers 308 (FIG. 3). For example, 16-bit parametric data can be stored in register 310-0, and 8-bit parametric data can be stored in register 310-1 of parameter registers 308. Furthermore, concatenated registers, groups of registers, and/or a suitably wide register (e.g., 24 bits) may be utilized to store such full and bit reduced parametric data versions.

In particular embodiments, a reduced-bit mode (RBM) for designated flags and/or thresholds is user-programmable. For example, the user may designate that flags corresponding to certain parameters be generated using bit-reduced techniques (RBM). In one example, a user may program optical transceiver 104 (e.g., utilizing data memory 112) via host 102 such that CPU 110 can identify which parameters have been designated for RBM-based flag generation. As discussed above, considerations of sensitivity versus safety regarding the underlying element or function associated with the monitored parameter may be used in determining which flags can be generated using RBM. For example, parametric data that represent critical or sensitive operations of optical transceiver 104 may be best programmed in a non-RBM mode (e.g., a full-bit value of the parametric data). However, certain parameters that may not directly correspond to safety or other critical operations of the optical transceiver may be good candidates for RBM. In either mode (e.g., RBM or non-RBM), the user may program which parameters are to be associated with flag generation using RBM. For example, a table or other mapping can store the user-programmed information in data memory 112 such that CPU 110 is configured to determine and/or indicate when a given flag associated with a certain predetermined parameter is to be generated using RBM.

When host 102 issues or provides a flag request to optical transceiver 104, CPU 110 may search or look up a setting in an RBM lookup table to determine whether the requested flag is to be obtained using RBM. Based on the value(s) in the RBM table, if a full-bit comparison mode is to be employed, the RBM control signal (shown as bus(es) and/or signal(s) RBM in FIG. 5) may be kept low, which may also be the default signal state of control signal RBM. In the example of FIG. 5, a low state of the control signal RBM may cause multiplexer 502-LW to select full-bit register value 314-LW instead of bit-reduced register value 314-LW'. Corresponding selections may also be made for the other thresholds (e.g., full-bit register value 314-HW instead of bit-reduced register value 314-HW' by multiplexer 502-HW, full-bit register value 314-LA instead of bit-reduced register value 314-LA' by multiplexer 502-LA, and full-bit register value 314-HA instead of bit-reduced register value 314-HA' by multiplexer 502-HA).

However, if the RBM table lookup for the flag requested indicates that the reduced-bit mode is to be used for a faster flag calculation, the RBM signal may be brought to a high state by CPU 110. The high state of control signal RBM can cause multiplexer 502-LW to select bit-reduced register value 314-LW' instead of full-bit register value 314-LW. Corresponding selections may also be made for the other thresholds (e.g., bit-reduced register value 314-HW' instead of full-bit register value 314-HW by multiplexer 502-HW, bit-reduced register value 314-LA' instead of full-bit register value 314-LA by multiplexer 502-LA, and bit-reduced register value 314-HA' instead of full-bit register value 314-HA by multiplexer 502-HA). In this fashion, threshold values corresponding to the designated bit mode for the particular flag requested can be chosen and provided (e.g., via 320-LW, 320-HW, 320-LA, and 320-HA) to comparator 306.

Thus, parametric data on bus 322, which may itself be a bit-reduced value depending on whether the corresponding flag is to be generated using RBM, may be compared against corresponding various thresholds on buses 320 at comparator 306. Control signal 304 may enable comparator 306 to provide an updated flag calculation at bus 324, which may then be stored in flag registers 316. Alternatively, the calculated flag value at bus 324 may be output directly to interface controller 114 for supply to host 102. The updated requested flag value on bus 324 may also be provided to interface controller 114 initially, and may be subsequently or simultaneously written into flag registers 316. In this fashion, the requested flag can be calculated and supplied to host 102 via a path optimized for calculated flag access speed.

Various multiplexers and designated bit selections for a reduced-bit mode are shown in the particular example of FIG. 5. However, any suitable approach(es) for generating reduced bits from thresholds and/or parametric data, comparing such reduced bits to generate a flag, and storing such reduced-bit values can be utilized in various embodiments. In one embodiment, bit-reduced values for parametric data and thresholds may be calculated automatically during normal operation. In such an embodiment, both full-bit and bit-reduced values can be retained, and selection of appropriate parametric data and thresholds can occur in response to a reduced-bit mode determination (e.g., via control signal RBM) for the requested flag. Alternatively, bit-reduced values can replace corresponding full-bit values in data memory 112. For example, thresholds corresponding to flags to be calculated via RBM can be modified to form bit-reduced thresholds, and these bit-reduced thresholds can be stored in threshold registers 312 in place of full-bit thresholds.

In addition, while the particular example of FIG. 5 shows an RBM control signal coupled to multiplexers 502, each multiplexer corresponding to each of thresholds for low warning, low alarm, high warning, and high alarm, such thresholds can also be controlled independently. For example, selective resolution can be utilized at a high end and/or or a low end of a range (e.g., for optical power) defined by a pair of thresholds. Thus, a user may program a reduced-bit mode to be used, e.g., for an inner "warning" range, while a full-bit mode is to be used for an outer "alarm" range. For example, a full-bit mode enable bit can be designated for each threshold and parameter to indicate when a flag corresponding to that threshold and parameter combination is to be calculated using full-bit mode or reduced-bit mode. To accommodate this approach, the RBM table in CPU 110 may contain columns for each threshold, and corresponding RBM control signals can be generated. One example of such an RBM mapping table is shown below as Table 1.

TABLE 1

| Parameter | Low Alarm Threshold | Low Warning Threshold | High Warning Threshold | High Alarm Threshold |
|---|---|---|---|---|
| Laser temperature | 1 | 1 | 1 | 1 |
| Optical receiver temperature | 1 | 1 | 0 | 0 |
| Transmitted digital power | 1 | 0 | 0 | 1 |
| Received digital power | 0 | 0 | 0 | 0 |

In the particular example of Table 1, each threshold for the laser temperature parameter can be enabled in a full-bit mode to provide for full resolution (e.g., using M-bit wide parametric data and thresholds). For the optical receiver temperature parameter, the low thresholds (e.g., low alarm and low warning) may be enabled in full-bit mode to provide full resolution, and the high thresholds may be configured for a reduced-bit mode (e.g., using N-bit wide parametric data and thresholds) to provide increased flag calculation speed. For the transmitted digital power parameter, the alarm thresholds (both low and high) may be configured for high resolution at this outer range, and the warning thresholds may be configured for lower resolution at the inner range. The received digital power parameter may be configured for reduced-bit mode or less resolution at each threshold. Of course, any suitable thresholds may be programmed into such a table in order to selectively optimize flag calculation resolution.

In addition, various thresholds themselves may be enabled or disabled in a similar fashion. That is, users can program individual thresholds (e.g., via bus(es) 330 coupled to interface controller 114), as well as information configured to determine whether a given programmed (or default) threshold is to be applied (e.g., via comparator 306) in flag calculation. For example, another bit value (e.g., a 1 [high] or 0 [low] bit value in a bit string with the full mode-bit enable bit shown in Table 1) can be included for each threshold and parameter in the example of Table 1. Thus, a '0' (e.g., a low) bit value programmed in the threshold enable value may indicate that a particular threshold is not to be considered for flag generation. In this case, comparator 306 can be configured to indicate that the parametric data provided on bus 322 does not exceed such a disabled threshold (e.g., and no such alarm or warning would be indicated regardless of the magnitude of the parametric data).

Figure 6:
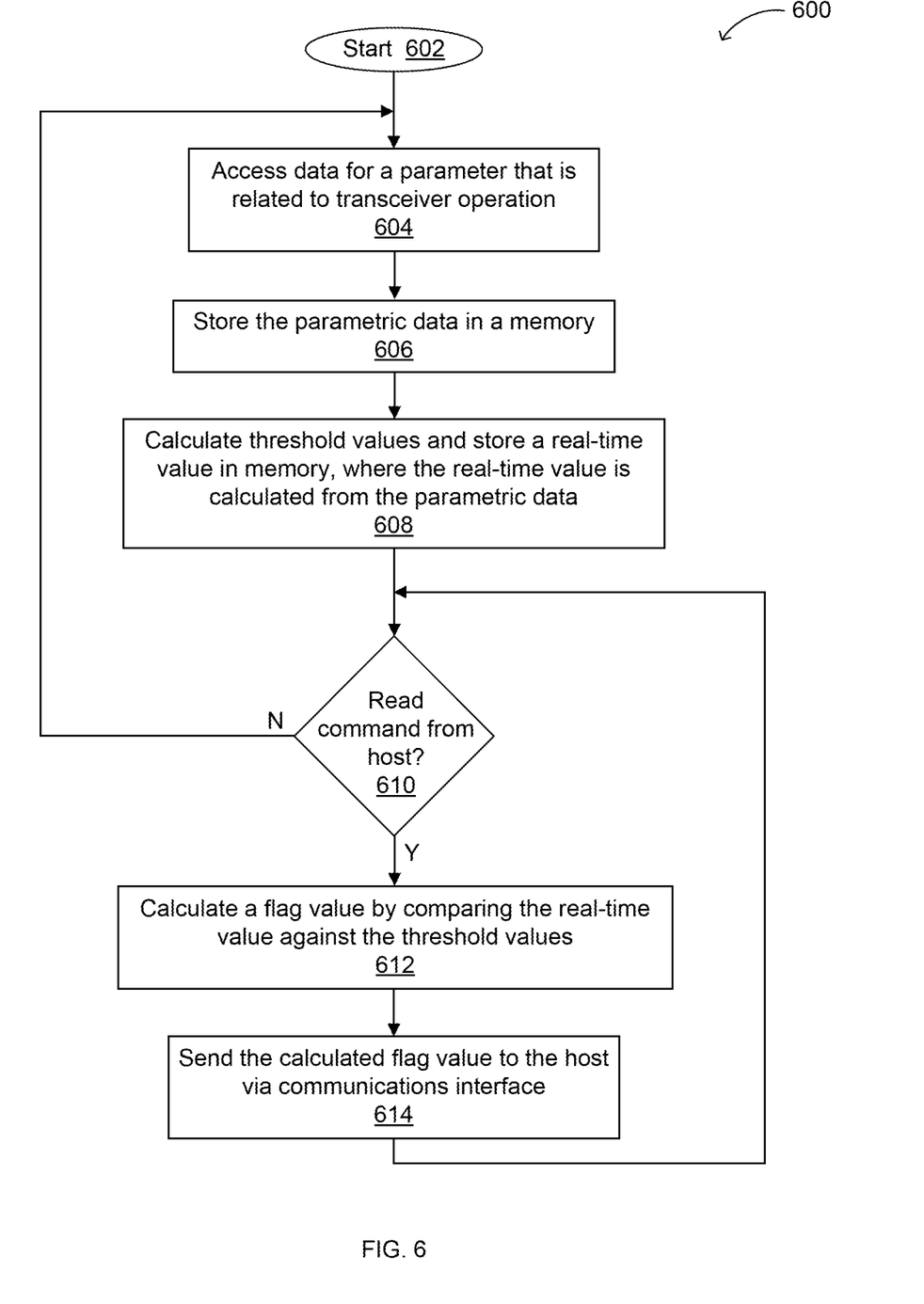
FIG. 6 is a flow diagram showing an exemplary method of generating operational status flags using optimized real-time or bit-reduced values in accordance with embodiments of the present invention.

FIG. 6 illustrates an exemplary method 600 of generating operational status flags using optimized real-time or bit-reduced values in accordance with embodiments of the present invention. The flow begins at 602, and parametric data related to transceiver operation(s) can be accessed at 604. For example, CPU 110 (see, e.g., FIG. 2) can access parametric data from ADC output register 202. At 606, the accessed parametric data can then be stored in a memory. For example, parametric data can be stored at a location 310 (see, e.g., FIG. 3) in parameter registers 308 within data memory 112. Thus, parametric data can be transferred from ADC output register 202 to a suitable location (e.g., a dynamically allocated location) in memory 312. Further, pointers can also be utilized to subsequently and/or simultaneously determine corresponding locations of stored parametric data in allocated memory 312.

Referring again to FIG. 6, bit-reduced threshold values can be calculated, and real-time or bit-reduced threshold values can be calculated from the parametric data stored in memory at 608. Here, a bit-reduced threshold value can be used as a different mathematical representation or manifestation of the stored threshold. For example, threshold value comparisons for a given parameter may not require an entire threshold value (e.g., 16 bits). Instead, the comparisons can utilize a predetermined subset (e.g., the 8 most significant bits) or other representation of that threshold value. In such an embodiment, a magnitude of the real-time value (e.g., via ADC output register 202; see FIG. 3) may be used to determine a divisor. For example, the divisor can be generated using the real-time value by determining a smallest number that can be divided by while still retaining an 8-bit number. The divisor along with thresholds (e.g., threshold 314 from threshold registers 312) can be divided by the divisor to produce corresponding bit-reduced (e.g., 8-bit) values.

At 610, if no flag request (e.g., a read command) from a host is received, the flow returns to 604 to access parametric data. Thus, continued parameter monitoring, accesses within the optical transceiver, calculation of bit-reduced parameters and/or threshold values, and storage of the bit-reduced values in data memory 112 may occur until a flag request is received from the host at 610. In one embodiment, such accessing of parametric data (604), storing of parametric data (606), and/or calculation of bit-reduced values (608) can be performed periodically utilizing a timer. In this fashion, bit-reduced versions of parametric data and/or corresponding thresholds can be periodically updated and made available for a subsequent flag request. When a request to read flag data is received from the host at 610, a flag value may be calculated at 612 by comparing the bit-reduced (e.g., real-time) values of corresponding parametric data against associated bit-reduced versions of predetermined thresholds. For example, an 8-bit real-time value of the corresponding parametric data can be compared against the associated 8-bit values calculated in 608 for the thresholds. In addition, user-configured enabling of reduced-bit mode operations on both a parameter and a threshold basis can be considered, as discussed above.

At 614, the calculated flag can then be retrieved from data memory 112 and sent to the host via a communications interface, and the flow may return to 610 to determine if there is another read command from the host. For example, a bit-reduced version of parametric data 310-2 can be compared against bit-reduced versions of associated threshold(s) 314-2, whereby the calculated flag is passed via bus 324 for storage in register 318-2 in flag registers 316. The flag data from register 318-2 can then be supplied to interface controller 114 via data memory output signal 222, and then sent from interface controller 114 to host 102 via host communications interface 122. Once another flag read request is received from the host at 610, this flag read request can similarly be translated to access new bit-reduced parametric data and thresholds from data memory 112 for calculation of a new flag value. In one embodiment, if there is no pending request for a flag from the host at 610, the flow may return to 604 to access parametric data. In further embodiments, both of a first loop 604, 606 and 608 can run continuously and/or simultaneously with a second loop 610, 612 and 614.

Particular embodiments are also suitable for non-point-to-point applications, such as a point-to-multipoint network configuration (e.g., a passive optical network [PON]) of optical transceivers. In such a configuration, optical splitters may be used to enable a single optical fiber to serve multiple premises. In a point-to-multipoint arrangement, additional or alternative parameters (e.g., those that do not exist in a pointto-point configuration) may be utilized. Furthermore, various tests can be defined to distinguish between properties of different optical transceivers that are arranged, e.g., in a PON. For example, rules providing constraints for designated optical transceivers can be applied to determine if any appropriate thresholds (e.g., maximum power, transmitter access allowance, etc.) are exceeded on the network.

Exemplary Software

The present invention also includes algorithms, computer program(s) and/or software, implementable and/or executable in an embedded device, such as a network switch, router, etc., or a general purpose computer or workstation equipped with a conventional digital signal processor, configured to perform one or more steps of the method and/or one or more operations of the hardware. Typically, in the present disclosure, the host is such an embedded device. Thus, a further aspect of the invention relates to algorithms and/or software that implement the above method(s). For example, the invention may further relate to a (non-transitory) computer program or computer-readable medium containing a set of instructions which, when executed by an appropriate processing device (e.g., a signal processing device, such as a microcontroller, microprocessor or DSP device), is configured to perform the above-described method and/or algorithm.

For example, the computer program may be on any kind of readable medium, and the computer-readable medium may comprise any (non-transitory) medium that can be read by a processing device configured to read the medium and execute code stored thereon or therein, such as a floppy disk, CD-ROM, magnetic tape or hard disk drive. In some embodiments, the part or parts of the software and/or algorithm(s) that reside in the host may be included in general purpose computer software (e.g., a driver), encoded and/or stored on such a medium. Such code may comprise object code, source code and/or binary code.

In the present disclosure, the code is generally configured for transmission through an appropriate medium, such as copper wire, a conventional twisted pair wireline, a conventional network cable, a conventional optical data transmission cable, or even air or a vacuum for wireless signal transmissions, as are signals generated in accordance with the code or hardware executing the code. The code for implementing the present method(s) is generally digital, and is generally configured for processing by a conventional digital data processor (e.g., a microprocessor, microcontroller, or logic circuit such as a programmable gate array, programmable logic circuit/device or application-specific [integrated] circuit).

In various embodiments, the computer-readable medium comprises at least one instruction to generate operational status flags in an optical transceiver, including (i) accessing data for each of a plurality of parameters that are related to operation of the optical transceiver; (ii) storing the parametric data in one or more memories; (iii) receiving a request for one or more flags from a host, the flags to indicate whether the data for a corresponding one or more parameters has exceeded a first or a second predetermined threshold; and (iv) calculating the one or more flags in response to the request from the host by comparing the data for the corresponding one or more parameters against the first and second thresholds.

CONCLUSION

Embodiments of the present invention advantageously provide for more accurate and updated flag calculations with optimized resolutions to provide improved operational status determinations for the optical transceiver. Particular embodiments also utilize user configurable options to control full-bit mode and reduced-bit mode, and to enable and define various thresholds for operational status flag generation.

While the above examples include particular implementations of registers and other memory arrangements, as well as multiplexers and comparators, one skilled in the art will recognize that other technologies and arrangements may also be used in accordance with embodiments. For example, other digital logic or elements can be used in certain embodiments. Further, one skilled in the art will recognize that other forms of signaling and/or control (e.g., current-based signaling, flag-based signaling, differential signaling, etc.) may also be used in accordance with various embodiments.

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An optical transceiver, comprising:
(a) an optical receiver configured to receive optical data;
(b) an optical transmitter configured to transmit optical data;
(c) one or more memories configured to store data and a plurality of thresholds for each of a plurality of parameters that are related to operation of at least one of said optical receiver and said optical transmitter;
(d) a data processor that, in response to a request from a host for one or more flags for a given parameter among the plurality of parameters, updates said data for said given parameter, accesses or retrieves at least one of said plurality of thresholds for said given parameter, compares said updated data for said given parameter against said at least one of said plurality of thresholds to calculate said one or more flags, and outputs said one or more flags indicating whether a corresponding parameter has exceeded said at least one of said plurality of thresholds;
(e) one or more first direct signal paths directly between said data processor and said one or more memories, configured to carry said data and said at least one of said plurality of thresholds for said given parameter; and
(f) an interface configured to (i) receive a request for said one or more flags from said host, (ii) provide said request to said data processor using a second direct signal, (iii) receive said one or more flags directly from said data processor, and (iv) provide said one or more flags to said host in response to said request.

2. The optical transceiver of claim 1, further comprising one or more analog-to-digital converters (ADCs) coupled to said optical transmitter and said optical receiver, wherein said one or more memories comprises a plurality of registers corresponding to said one or more ADCs, and each of said registers is configured to store data for one of said parameters.

3. The optical transceiver of claim 1, wherein a first one of said plurality of thresholds represents a low threshold limit for said one or more of said plurality of parameters.

4. The optical transceiver of claim 3, wherein a second one of said plurality of thresholds represents a high threshold limit for said one or more of said plurality of parameters.

5. The optical transceiver of claim 1, wherein said plurality of parameters comprise at least two members of the group consisting of temperature of laser, temperature of module, temperature of optical receiver, voltages, optical bias current, transmitted optical digital power, received optical digital power, received optical video power, radio-frequency (RF) output power, and laser wavelength.

6. The optical transceiver of claim 1, wherein said data processor calculates said one or more flags only after said interface receives said request from said host.

7. The optical transceiver of claim 4, wherein said data processor is configured to compare a bit-reduced version of said one or more of said plurality of parameters against a corresponding bit-reduced version of each of said first and second ones of said plurality of thresholds.

8. The optical transceiver of claim 1, wherein said one or more memories comprises (i) a first volatile memory block configured to store said plurality of thresholds and (ii) a second volatile memory block configured to store data for all of said plurality of parameters.

9. An optical triplexer, comprising the optical transceiver of claim 1.

10. A method of generating operational status flags in an optical transceiver, the method comprising:
(a) accessing data for each of a plurality of parameters that are related to operation of said optical transceiver;
(b) storing said data in one or more memories;
(c) receiving a request for one or more flags from a host, said one or more flags to indicate whether said data for a corresponding one or more of said plurality of parameters has exceeded one or more predetermined thresholds;
(d) in response to said request from said host, updating said data for said corresponding one or more of said plurality of parameters and calculating said one or more flags using a data processor, wherein said one or more flags are calculated by comparing said updated data for said corresponding one or more of said plurality of parameters against said predetermined threshold(s); and
(e) sending said one or more flags calculated by said data processor from said data processor directly to an interface with said host.

11. The method of claim 10, wherein said calculating said one or more flags comprises:
(a) determining an N-bit version of said data for each of said one or more of said plurality of parameters, wherein said data comprises M bits, and M is greater than N; and
(b) comparing said N-bit versions of said data against corresponding N-bit versions of said predetermined threshold(s).

12. The method of claim 11, wherein said determined N-bit versions of said data and said N-bit versions of said predetermined threshold(s) are stored in said one or more memories prior to receiving said request from said host for said one or more flags.

13. The method of claim 11, wherein said determining said N-bit versions of said parametric data is periodically performed using a timer.

14. The method of claim 13, wherein said timer is also used to periodically determine said corresponding N-bit versions of said predetermined threshold(s).

15. The method of claim 11, further comprising enabling said determining and said comparing of said N-bit versions of said parametric data with a user option.

16. The method of claim 10, wherein said parametric data is an output of an analog-to-digital converter (ADC), and said one or more memories comprises a register receiving said output of said ADC.

17. The method of claim 10, wherein said output of said ADC is stored in said register when a request for said data is received from said host.

18. A system for generating operational status flags, the system comprising:
(a) an optical transceiver configured to transmit and receive optical data, wherein said optical transceiver comprises an interface, a data processor and a memory, said data processor being configured to, in response to a request from a host in said system, update parametric data for said given parameter, access or retrieve a plurality of predetermined thresholds for said given parameter from said memory on a first direct signal, and calculate one or more of said operational status flags, said interface providing said request directly to said data processor and receiving said one or more operational status flags directly from said data processor, and said memory being configured to store said parametric data and said plurality of predetermined thresholds, wherein said parametric data is related to one or more operations of said optical transceiver; and
(b) said host, configured to provide said request to said optical transceiver for said one or more operational status flags, said operational status flags indicating whether a corresponding parameter has exceeded at least one of said thresholds, said host being configured to receive said one or more operational status flags from said optical transceiver in response to said request.

19. The system of claim 18, wherein said optical transceiver further comprises an analog-to-digital converter (ADC), said ADC having a register configured to store said parametric data prior to said request for said one or more flags being received from said host.

20. The system of claim 18, wherein said parametric data comprises data for at least two members of the group consisting of temperature of laser, temperature of module, temperature of optical receiver, voltages, optical bias current, transmitted optical digital power, received optical digital power, received optical video power, radio-frequency (RF) output power, and laser wavelength.

21. The method of claim 10, wherein updating said data for said corresponding one or more of said plurality of parameters comprises reading parametric data contents of a register that receives data from an analog-to-digital converter that interfaces with an optical transmitter and/or an optical receiver of the optical transceiver.

22. The optical transceiver of claim 1, wherein the data processor comprises (i) a flag generation controller that receives said request from said interface on a second direct signal and (ii) a comparator that provides said one or more flags to said interface on said second direct signal.

* * * * *